United States Patent [19]
Blizzard

[11] Patent Number: 5,648,173
[45] Date of Patent: Jul. 15, 1997

[54] ROOM TEMPERATURE, MOISTURE-CURABLE ABRASION-RESISTANT COATING COMPOSITION HAVING ENHANCABLE WEATHERABILITY

[75] Inventor: John Donald Blizzard, Bay City, Mich.

[73] Assignee: Dow Corning Corporation, Midland, Mich.

[21] Appl. No.: 591,057

[22] Filed: Jan. 25, 1996

[51] Int. Cl.$^6$ ........................................ B32B 27/36
[52] U.S. Cl. .............. 428/446; 528/26; 528/38; 528/39; 428/447
[58] Field of Search ................ 528/26, 38, 39; 428/447, 446

[56] References Cited

U.S. PATENT DOCUMENTS

| | | | |
|---|---|---|---|
| 3,986,997 | 10/1976 | Clark | 260/29.2 |
| 4,455,205 | 6/1984 | Olson et al. | 204/159.13 |
| 5,260,350 | 11/1993 | Wright | 522/42 |
| 5,368,941 | 11/1994 | Blizzard et al. | 428/412 |
| 5,403,535 | 4/1995 | Blizzard et al. | 264/293 |

FOREIGN PATENT DOCUMENTS 0486469  9/1987  European Pat. Off. ...... C08F 230/08

OTHER PUBLICATIONS

"Hindered Amine Light Stabilizer For Coatings" Ciba–Geigy Corporation 1989, Tinuvin 292.
"Additives For Coatings" Ciba–Geigy Corporation, 1993.

*Primary Examiner*—Margaret W. Glass
*Attorney, Agent, or Firm*—Arne R. Jarholm

[57] ABSTRACT

A room temperature, moisture-curable abrasion-resistant coating is formulated from (A) a multifunctional acrylate, (B) an alkoxyfunctional organometallic compound of the general formula $(OR)_4M$, wherein M is selected from group consisting of Ti and Si and (C) a trialkoxyaminosilane. The ratio of (C) to (A) is selected such that the molar ratio of $NH_2$ groups to functional acrylate groups is at least 10:1. The composition of the invention is said to have enhancable weatherability because the cure mechanism relies on moisture and is not adversely affected by the inclusion of substantially high quantities of UV protectants in the form of ultraviolet light absorbers and free radical scavengers.

19 Claims, No Drawings

ROOM TEMPERATURE, MOISTURE-CURABLE ABRASION-RESISTANT COATING COMPOSITION HAVING ENHANCABLE WEATHERABILITY

BACKGROUND OF THE INVENTION

1. Field of the Invention

The present invention relates generally to the field of compositions that form abrasion-resistant coatings and more particularly to such a composition that is curable at room temperature, utilizing atmospheric moisture in the cure mechanism. A feature of the coating of the invention is that its weatherability may be enhanced.

2. Description of the Prior Art

Numerous compositions for forming abrasion-resistant coatings on various types of substrates are well-known in the art. Such abrasion-resistant coatings are frequently applied over polycarbonate substrates. The coated substrates are used as a substitute for glass, as in the case of lenses for automobile head lamps. Other uses include coatings for glass, polyethylene terephthalate containers, wood surfaces and additives for inks and pigmented coatings.

Silicone compositions of the above type are disclosed in U.S. Pat. No. 4,455,205 to Olson et al. (issued Jun. 19, 1984 and assigned to General Electric Company, Schenectady, N.Y.) The coatings comprise an ultraviolet ("UV") light-curable composition prepared from a multifunctional acrylate monomer, an acryloxyfunctional silane and aqueous colloidal silica in a polar solvent. After mixing the components, the solvent and remaining water is removed in vacuo, with gentle heating, a step which is termed "stripping." A photoinitiator is then added and the composition may be cured by exposure to UV radiation.

U.S. Pat. No. 5,403,535 Blizzard et al. discloses a radiation-curable abrasion-resistant coating which utilizes a multifunctional acrylate monomer, an alkoxy-functional aminosilane, colloidal silica and acrylate-terminated poly-alkylenoxide. In the composition of Blizzard et al. the alkoxy-functional aminosilane forms a Michael adduct with the multifunctional acrylate. An excess of multifunctional acrylate is used so that curing of the composition can be carried out by ultraviolet light-initiated free radical polymerization.

U.S. Pat. No. 3,986,997 Clark discloses a thermally-curable abrasion-resistant coating composition including a dispersion of colloidal silica and hydroxylated silsesquioxane in an alcohol-water medium. The coating composition is useful for providing a scratch-resistant coating on spectacles.

European Patent Application Publication No. 0 486 469 A1 discloses a thermally-curable abrasion-resistant coating composition prepared from the hydrolysis/condensation of an alkoxy-functional organometallic compound to a sol-gel and the addition of an alkoxy-functional silane. The materials are also disclosed as being useful as a paint additive.

While the compositions of the prior art can provide useful abrasion-resistant coatings over a wide variety of substrates, they all utilize a curing mechanism that involves the application of heat or exposure to radiation.

It is well-known in the art to add ultraviolet light absorbers and free radical scavengers (collectively referred to herein as "UV protectants") to coating formulations for the purpose of enhancing their weatherability. In a coating composition that cures by ultraviolet light radiation, only a limited amount of such protectants can be added without causing interference with the curing mechanism.

Thermally-curable coating compositions also have drawbacks. First of all, many substrates suffer deleterious effects from the thermal excursion necessary for curing such compositions. The same is true of many ultraviolet light protectants, which may decompose or lose their efficacy if exposed to high temperatures.

Thus, it would be highly desirable to provide an abrasion-resistant coating that could cured under ambient conditions, much like room temperature vulcanizable sealants, such as bathroom caulking materials. Likewise, it would be highly desirable to provide such a coating wherein the weatherability could be enhanced by the addition of substantial quantities of UV protectants.

BRIEF DESCRIPTION OF THE INVENTION

It is therefore an object of the present invention to provide a room temperature-curable composition capable of forming an abrasion-resistant coating upon curing.

It is another object of the invention to provide a composition capable of curing into an abrasion-resistant coating, which cured coating may include a substantial quantity of UV protectants.

It is a feature of the composition of the present invention that it resists weathering from exposure to moisture.

It is another feature of the present invention that the composition which forms an abrasion-resistant coating utilizes atmospheric moisture in its cure mechanism.

In accordance with the present invention, there is provided a room temperature, moisture-curable composition, which upon curing exhibits abrasion resistance. The composition of the present invention comprises the following components:

(A) at least one multifunctional acrylate, having a general formula which includes a plurality of functional acrylate groups;

(B) at least one alkoxy-functional organometallic compound selected from the group consisting of 1) organometallic compounds having the empirical formula $M(OR)_4$, wherein M is selected from the group consisting of Si and Ti, and each OR is the same or a different alkoxy group and 2) hydrolyzates of the organometallic compounds of 1);

(C) at least one trialkoxyaminosilane of the general formula

$(OR)_3Si(QNH)_dQNH_2$ wherein each OR is as defined above, Q is a divalent hydrocarbon group, which Q groups may be the same or different, and d is 0 or 1;

said at least one multifunctional acrylate (A) and said at least one trialkoxyaminosilane (C) being present in quantities such that the molar ratio of $NH_2$ groups to functional acrylate groups is at least 10:1; and said composition, without additional components added thereto, when moisture-cured, exhibiting a Taber abrasion T-100 number of about 10 or less and a Taber abrasion T-500 number of about 15 or less.

The aforementioned objects and features of the present invention, as well as others, will become apparent to those skilled in the art from the following detailed description of the invention, including examples of various embodiments thereof.

DETAILED DESCRIPTION OF THE INVENTION

In accordance with the present invention, there is provided a composition which is moisture-curable at room temperature. Those skilled in the art will appreciate that such cure systems may rely upon the reaction of such compositions with atmospheric moisture. Under conditions of relative humidity of about 50%–60%, the composition of the invention can be formulated such that it sets to a tack-free condition in 15 to 30 minutes.

The first component of the invention (A), a multifunctional acrylate, is an organic monomer or oligomer which includes two or more functional groups selected from the group consisting of acryloxy and methacryloxy groups. As used herein, the term "functional acrylates groups" includes both acryloxy and methacryloxy groups. The multifunctional acrylates may be used singly or in combination.

Those skilled in the art will recognize that the terms "oligomer" and "polymer" are frequently used interchangeably. Although "oligomer" is generally used to describe a relatively short polymer, the term has no generally accepted definition with respect to the number of repeating monomer units. As used herein then, the term "oligomer" is meant to include molecules that may also be properly referred to as polymers.

The only other restriction with respect to the multifunctional acrylates used in the compositions of invention, is that the acrylates be compatible with the remaining components of the invention, meaning that they do not have a deleterious effect that defeats the desired application for the composition. It should be noted, however, that the tendency of a given acrylate to produce a deleterious effect can, in certain circumstances, be overcome. For instance, the use of certain multifunctional acrylates may raise the viscosity of the composition of the invention to a point where it is unusable to provide a thin abrasion-resistant coating on a substrate. If, however, the composition can be rendered usable by the addition of an appropriate solvent, then the use of that multifunctional acrylate is not considered to be excluded from the present invention.

Several multifunctional acrylate monomers useable as component (A) are listed below:

the following diacrylates
1,6-hexanediol diacrylate,
1,4-butanediol diacrylate,
ethylene glycol diacrylate,
diethylene glycol diacrylate,
tetraethylene glycol diacrylate,
tripropylene glycol diacrylate,
neopentyl glycol diacrylate,
1,4-butanediol dimethacrylate,
poly(butanediol) diacrylate,
tetraethylene glycol dimethacrylate,
1,3-butylene glycol diacrylate,
triethylene glycol diacrylate,
triisopropylene glycol diacrylate,
polyethylene glycol diacrylate, and
bisphenol A dimethacrylate;

the following triacrylates
trimethylolpropane triacrylate,
trimethylolpropane trimethacrylate,
pentaerythritol monohydroxy triacrylate, and
trimethylolpropane triethoxy triacrylate;

the following tetraacrylates
pentaerythritol tetraacrylate, and
di-trimethylolpropane tetraacrylate;

and a pentaacrylate known as
dipentaerythritol (monohydroxy) pentaacrylate.

These multifunctional acrylate monomers are commercially available from Aldrich Chemical Company, Inc., Milwaukee, Wis.

Examples of some specific multifunctional acrylate oligomers usable as component (A) are as follows:

epoxy acrylates
Bisphenol A epoxy diacrylate, available from Sartomer Company, Inc. of Exton, Pa. and sold under the designation CN104. CN104 has a viscosity of 3500 cps at 65° C. and a specific gravity of 1.15.

urethane acrylates
Hexafunctional aromatic urethane acrylate with an acrylated polyol diluent which is sold under the designation Ebecryl® 220 by UBC Radcure, inc. of Louisville, Ky. Ebecryl® 220 has a molecular weight of 1,000 and a viscosity of 28,000 cps at 25° C.
Aliphatic urethane diacrylate which is available under the designation Ebecryl® 230 from UBC Radcure, Inc. of Louisville, Ky. Ebecryl® 230 has a molecular weight of 5,000 and a viscosity of 40,000 cps at 25° C.

polyester acrylate
Tetrafunctional polyester acrylate which is sold under the designation Ebecryl® 80 by UBC Radcure, Inc. of Louisville, Ky. Ebecryl® 80 has a molecular weight of 1,000 and a viscosity of 3,500 cps at 250° C.

polybutadiene diacrylate
available from Sartomer Company, Inc. of Exton, Pa. under the designation CN300 and has a molecular weight of 3,000 and a viscosity of 4,500–5,000 cps at 25° C.

As a general rule of thumb, the use of monomeric multifunctional acrylates in the composition of the invention generally results in a cured coating having hard, abrasion-resistant characteristics. On the other hand, the use of oligomeric multifunctional acrylates generally produces a slightly softer, but more flexible cured coating. The present inventors have noted that there is at least some correlation between the use of oligomeric multifunctional acrylates and decreased gas permeability of the cured coating. The use of monomeric/oligomeric multifunctional acrylate blends can balance the desired properties of the cured coating composition of the invention.

The next component of the invention (B), an alkoxy-functional organometallic compound, has the empirical formula $M(OR)_4$ wherein M is selected from the group consisting of Si and Ti, and each OR is the same or a different alkoxy group. Accordingly, examples of this component include tetramethoxy silane, tetraethoxy silane (also called tetraethyl orthosilicate) and tetrabutyl titanate. As used herein the term "organometallic compound" is specifically meant to include compounds based upon silicon, even though silicon arguably does not possess all the characteristics of a true metal.

The third component of the composition of the invention (C), is a trialkoxyaminosilane of the general formula

$$(OR)_3Si(QNH)_dQNH_2$$

wherein each OR is as defined above, Q is a divalent hydrocarbon group, which Q groups may be the same or different, and d is 0 or 1.

Amino and diamino radicals form a Michael adduct with an acrylate group. Thus, bonding between trialkoxyaminosilane (C) and the functional acrylate groups of (A) occurs during formulation of the composition of the invention and not upon curing.

Examples of suitable trialkoxyaminosilanes include 3-aminopropyltriethoxysilane, 3-aminopropyltrimethoxysilane; and n-(2-aminoethyl)-3-aminopropyltrimethoxysilane. These silanes are commercially available from Huels America, Inc., Bristol, Pa. Another supplier of aminofunctional alkoxy silanes is Dow Corning Corporation, of Midland, Mich.

An important limitation with respect to the present invention, and an important distinction over the prior art is the fact that components (A) and (C) are used in such quantities that the molar ratio of $NH_2$ groups in the trialkoxyaminosilane to the functional acrylate groups of the multifunctional acrylate is at least about 10:1. Unless this ratio is maintained, the formulation tends to form an intractable white precipitate, resulting in an unusable composition.

A number of the radiation-curable coating compositions of the prior art utilize the formation of a Michael adduct between a trialkoxyaminosilane and a multifunctional acrylate. (See, for instance, U.S. Pat. No. 5,260,350 Wright and U.S. Pat. No. 5,368,941 Blizzard et al.) In the formulation of those compositions, however, an excess of functional acrylate groups is combined with the aminosilane. Thus, in stark contrast to the composition of the present invention, only sterically-hindered unreacted amine sites remain.

In the preferred embodiment of the present invention, component (B), the alkoxy-functional organometallic compound is subjected to very mild hydrolysis in the presence of an acid catalyst, such as acrylic acid. The acid hydrolysis can be carried out in the presence of the multifunctional acrylate, followed by the addition of the trialkoxyaminosilane. It should be noted, however, that such mild hydrolysis is not required to obtain a composition that is within the scope of the present invention. Nonetheless, it is believed that the mild hydrolysis may assist in obtaining more abrasion-resistant cured coatings.

It should be further noted that the use of an acid catalyst is not necessary to promote the moisture curability of the present invention. It is believed that the alkalinity of the trialkoxyaminosilane provides sufficient catalysis for the room temperature moisture-cure of the composition of the invention. In fact, when this component (C) is omitted, the remaining components of composition do not exhibit the phenomenon of moisture cure.

An important feature of the present invention is the ability to add substantial quantities, up to at least 15 weight percent, of UV protectants, including ultraviolet light absorbers and free radical scavengers, to the composition, without affecting the ability of the composition to cure to an abrasion-resistant state.

The composition of the invention may be applied to substrates by known methods such as flow coating, dip coating, spin coating, spray coating or curtain coating. A coating thicknesses between 3–25 microns, and preferably about 5 microns, is generally recommended for applications calling for abrasion resistance. The composition of the invention can be used to form abrasion resistant coatings on numerous substrates including those fabricated from polycarbonate, polyethylene, polypropylene, polyethylene terphthalate, polystyrene, glass and wood.

The abrasion resistance of the cured compositions of the invention was determined according to ASTM Method D-1044. The instrument used was a Teledyne model 503 Taber Abrader with two 250 gram auxiliary weights (500 gram load) for each of the CS10F abrasive wheels. In accordance with the ASTM method, coated polycarbonate Taber panels were subjected to 100 and 500 cycles on the abrader turntable (T-100 and T-500, respectively). The percent change in haze, which is the criterion for determining the abrasion resistance of the coating, was determined by measuring the difference in haze of the unabraded and abraded coatings. Haze is defined as the percentage of transmitted light which, in passing through the sample, deviates from the incident beam by forward scattering. In this method, only light flux that deviates more than 2.5 degrees on average is considered to be haze. The percent haze on the coatings was determined by ASTM Method D-1003. A Gardner Haze Meter was used and the haze was calculated by measuring the amount of diffused light, dividing by the amount of transmitted light and multiplying by one hundred.

The yellowness index of some of the cured and coated compositions was also measured using a Gardner Haze Meter. ASTM-D1925, *Yellowness Index of Plastics*, was followed for these measurements. The yellowness index is expressed as a percent and therefore ranges from 0 to 100.

The above-described Taber abrasion testing is not limited to use with coated polycarbonate test panels. In the event that a given composition does not adhere to a polycarbonate substrate, any other substantially transparent, preferably plastic, substrate may be used, so long as the composition adheres thereon.

Those skilled in the art will appreciate that cured coating compositions having Taber abrasion values of T-100 less than or equal to about 10 and T-500 values less than or equal to about 15 exhibit substantial abrasion resistance. Furthermore, it will be appreciated that values of T-100 less than or equal to 5 and T-500 less than or equal to 10 characterize coating compositions exhibiting very high abrasion resistance.

Adhesion of a cured composition to a given substrate was measured by a cross-hatch adhesion test. A series of cross-hatched lines were scribed over one square inch of the surface of a substrate coated with a cured experimental composition. The scribed lines are spaced approximately 1/10 inch apart so as to form 100 squares, measuring approximately 1/10 inch on a side. The scribed surface is covered with No. 600 Scotch Brand adhesive tape which is pressed down firmly over the cross-hatched area. The tape is then withdrawn from the surface of the substrate with one rapid motion at about a 90° angle. The action of applying and removing the tape is carried out three times, after which the specimen is observed. The number of squares remaining intact on the substrate is a measure of the adhesion of the experimental composition. The number of squares remaining intact is reported as a percentage of the total number of squares on the grid.

EXAMPLE COMPOSITIONS THE EFFECTS OF COMPOSITION ON ABRASION-RESISTANCE AND CURE

Several Example Compositions were prepared utilizing various proportions of the above-described components (A) through (C). Some of the Example Compositions so-prepared clearly fall within the scope of the present invention, while others do not.

All blending of the following Example Compositions was carried out under conditions of constant stirring.

EXAMPLES 1–5

Five different compositions (Examples 1–5) were formulated by respectively adding different quantities (0.00 g, 1.25 g, 2.50 g, 5.00 g and 7.50 g) of tetraethoxysilane (TEOS) to five identical solutions prepared from 2.5 g of a difunctional epoxy acrylate (sold under the trade designation CN-104 by Sartomer Company, Exton, Pa. and having a viscosity of 19,300 cps at 49° C.) which had been diluted in 27.5 g of methanol. 0.1 g of acrylic acid and 0.1 g of water were then added to each solution and stirring continued for 30 minutes. Thereafter, 22.5 g of N-(2-aminoethyl)-3-aminopropyltrimethoxysilane (sold under the designation Dow Corning® Z-6020, by Dow Corning Corporation, Midland, Mich.) were added to each of the five solutions and mixing continued. The resulting solutions were then flow-coated onto a 0.020 inch (0.051 cm) thick polycarbonate panel and air-cured for 72 hours at 23° C. and about 50% relative humidity. The cured coatings had a thickness of about 5 microns and were subjected to Taber abrasion testing, yielding the following results:

TABLE 1

|  | TEOS g | T-100 | T-500 |
|---|---|---|---|
| Example 1 | 0.00 | 8.5 | 24.0 |
| Example 2 | 1.25 | 4.0 | 14.0 |
| Example 3 | 2.50 | 2.9 | 12.0 |
| Example 4 | 5.00 | 2.9 | 9.9 |
| Example 5 | 7.50 | 2.8 | 9.7 |

The above data show that the composition of the invention must include a minimum amount of component (B), the alkoxy-functional organometallic compound, in order for the cured coating to exhibit substantial abrasion resistance. Thus, Examples 2-5, inclusive, are within the scope of the present invention, while Example 1 is not.

EXAMPLE 6

10.0 g of TEOS were added to 5 g of a hexafunctional aromatic urethane acrylate oligomer containing an acrylated polyol diluent (available from UBC Radcure, Inc., Atlanta, Ga. under the designation Ebecryl® 220 and having an oligomer molecular weight of 1,000 and a viscosity of 28,000 cps at 25° C.) and mixed for 60 minutes. Thereafter, 45 g of N-(2-aminoethyl)-3-aminopropyltrimethoxysilane (Z-6020) were added and thoroughly mixed. The resulting composition was coated onto a 0.020 inch (0.051 cm) thick polycarbonate substrate, cured at 23° C. and 58% relative humidity and subjected to Taber abrasion testing. The cured coating composition exhibited a T-100 of 2.0 and a T-500 of 9.8.

Example Composition 6 is clearly within the scope of the present invention. It was specifically prepared for the purpose of illustrating an additional embodiment of the invention, namely, one having a multifunctional acrylate different than that utilized in the preparation of Examples 2-5.

EXAMPLE 7

This composition was prepared to measure the cure rate of typical compositions of the invention.

10.0 g of TEOS were added to a solution of 5 g CN-104 difunctional epoxy acrylate in 55 g of methanol and mixed for 30 minutes. Thereafter, 45 g of N-(2-aminoethyl)-3-aminopropyltrimethoxysilane (Z-6020) were added and mixing continued for 60 minutes. The resulting composition was coated on the same type of polycarbonate panels and moisture-cure was initiated by placing the coated panels in an environment maintained at 23° C. and 58% relative humidity. The cure rate of the composition was checked by testing tackiness to the touch and visual observation of the resistance to scratching after rubbing with steel wool. The results, as a function of time, are set forth in Table 2 below:

TABLE 2

| cure time (min.) | tackiness | steel wool scratch |
|---|---|---|
| 2 | very tacky | not tested |
| 5 | slightly tacky | not tested |
| 10 | tack-free | poor |
| 15 | dry, tack-free | good |
| 30 | dry, tack-free | good |
| 60 | dry, tack-free | very good |

Three of the coated panels were further subjected to extended cure periods. The coated panels were then subjected to Taber abrasion testing. The results are set forth in Table 3 below:

TABLE 3

| cure time | T-100 | T-500 |
|---|---|---|
| 4 hours | 3.2 | 19.0 |
| 24 hours | 2.1 | 9.6 |
| 48 hours | 1.5 | 9.5 |

It can be seen that this embodiment of the composition of the present invention reaches its maximum abrasion resistance after about 24 hours cure time at the stated temperature and relative humidity. The Taber abrasion data show that the composition of Example 7 is clearly within the scope of the present invention.

EXAMPLE 8

A composition was prepared in a manner identical to that disclosed in Example 6, except that 45 g of aminopropyltriethoxysilane, a monoamine, was substituted for the N-(2-aminoethyl)-3-aminopropyltrimethoxysilane (Dow Corning® Z-6020.) When cured in an identical manner, the coating composition exhibited Taber abrasion values of T-100 at 4.0 and T-500 at 12.4. Thus, it is clear that the composition of Example 8 falls within the scope of the present invention.

This coating composition was found to exhibit 100% cross-hatch adhesion to polycarbonate, glass, wood (pine) and polypropylene substrates.

EXAMPLE 9

10 g of TEOS were mixed into a solution of 5 g of Ebecryl® 220 (the hexafunctional aromatic urethane acrylate oligomer containing an acrylated polyol diluent discussed in Example 6) which had been diluted with 5 g of methanol. Thereafter 22.5 g of N-(2-aminoethyl)-3-aminopropyltrimethoxysilane (Dow Corning® Z-6020) and 22.5 g of 3-methacryloxypropyltrimethoxysilane (Dow Corning® Z-6030) were thoroughly blended with the existing solution. The composition of Example 9 then had one-half the $NH_2$ content of Example 6 but was virtually identical in all other respects.

The composition was then coated on a polycarbonate panel and air cured for 24 hours at 23° C. and 58% relative humidity. Under Taber abrasion testing the composition exhibited a T-100 of 5.8 and a T-500 of 36.0.

From the Taber abrasion data generated with respect to Example 9 when compared to that generated for Example 6, it is clear that the composition of the invention requires a minimum molar ratio of $NH_2$ groups to acrylate groups in order to obtain the requisite abrasion resistance. Thus, the composition of Example 9 is clearly outside the scope of the present invention.

EXAMPLE 10

10 g of TEOS were added to 5 g of Ebecryl® 220 (the hexafunctional aromatic urethane acrylate oligomer containing an acrylated polyol diluent discussed in Example 7) which had been diluted with 5 g of methanol. Thereafter, 45 g of 3-methacryloxypropyltrimethoxysilane (Dow Corning® Z-6030) were thoroughly blended with the existing solution. When subjected to 24 hours of air-curing at 23° C. and 58% relative humidity, no curing of the composition was observed.

Example 10 was prepared to determine the necessity of component (C), the trialkoxyaminosilane, to the formulations of the invention. The failure of the composition to exhibit room temperature curing at all clearly shows that the composition of Example 10 falls outside the scope of the present invention.

EXAMPLES 11-17

This set of Example Compositions was prepared in order to determine the effect of the molar ratio of $NH_2$ groups (contributed by (C) the trialkoxyaminosilane) to acrylate groups (contributed by (A) the multifunctional acrylate) on the properties of the coating compositions.

2.5 g of TEOS were mixed with a solution of 2.5 g of CN-104 difunctional epoxy acrylate which had been diluted in 27.5 g of methanol. Thereafter, 0.1 g of water and 0.1 g of acrylic acid were added and mixed for 30 minutes. Varying amounts of N-(2-aminoethyl)-3-aminopropyltrimethoxysilane (Dow Corning® Z-6020) were then thoroughly blended with the preceding mixture to respectively produce composition Example Nos. 11-17.

Each of the Example compositions so-produced were then coated on polycarbonate panels and air-cured at for at least 24 hours at 23° C. and 58% relative humidity. The final coating thickness was about 5 microns and the cured coatings were subjected to Taber abrasion T-100 testing. The results are set forth in Table 4 below:

TABLE 4

| Example No. | moles $NH_2$/moles acrylate | T-100 |
|---|---|---|
| 11 | 1:1 | not measured, ppt.* |
| 12 | 2:1 | not measured, ppt.* |
| 13 | 5:1 | hazy, no adhesion** |
| 14 | 10:1 | 11.5 |
| 15 | 20:1 | 6.4 |
| 16 | 30:1 | 8.4 |
| 17 | 40:1 | 6.4 |

*An intractable precipitate rendered the composition unusable for coating.
**A very hazy cured film formed but failed to adhere to the polycarbonate sample. Haze level would have rendered Taber results questionable.

From the foregoing data it appears that the coating composition must have a molar ratio of $NH_2$ groups to acrylate groups of at least 10:1 to produce a viable, moisture-curable coating.

Example Composition Nos. 11-13 are outside the scope of the present invention because they fail to cure to usable coatings.

In Example No. 14 the molar ratio of $NH_2$ groups to acrylate groups was about 10:1. In this Example, however, the Taber abrasion T-100 value was measured at 11.4. The present invention requires that the value of T-100 be 10 or less. While it would appear that Example Composition No. 14 is outside the literal scope of the invention, the T-100 value is quite close to the stipulated value and based only upon a single test. Thus, it is possible that the value may be within the experimental error inherent to Taber abrasion testing. Further Taber testing, including a repetition of the T-100 test and conducting the T-500 test would seem to be warranted in order to determine whether the composition falls within the scope of the invention.

Example Composition Nos. 15-17 would appear to be within the scope of the present invention. Confirmation would, however, require that the cured compositions be subjected to T-500 Taber abrasion testing.

EXAMPLES 18-20

5.0 g, 10.0 g and 15.0 g quantities of tetrabutyltitinate (TBT) were respectively added to three samples (Examples 18, 19 and 20) of a solution of 5.0 g the Ebecryl® 220 hexafunctional aromatic urethane acrylate oligomer discussed in connection with Example Composition 6 and 5.0 g methanol. After 30 minutes, 45.0 g of aminopropyltriethoxysilane were thoroughly blended into each solution. The resulting solutions were then coated on polycarbonate panels, cured for 24 hours at 23° C. and 52% relative humidity, and subjected to Taber abrasion testing. The results are set forth in below in Table 6.

TABLE 6

| Example No. | TBT (g) | T-100 | T-500 |
|---|---|---|---|
| 18 | 5.0 | 13.0 | 21.7 |
| 19 | 10.0 | 8.7 | 13.6 |
| 20 | 15.0 | 6.7 | 10.5 |

The above results show that Example Nos. 19 and 20 have adequate abrasion resistance so as to be considered within the scope of the present invention. Example Composition No. 18, however, fails to meet the requisite abrasion resistance.

Example No. 19 was further applied to glass, wood (pine) and polypropylene. Cross-hatch adhesion to those substrates, as well as polycarbonate, was 100%. Cross-hatch adhesion to a polystyrene substrate was 80% and to a polyethylene terphthalate substrate was 0%.

EXAMPLE 21

5.0 g of tetrabutyltitinate (TBT) and 5.0 g of TEOS were added to a solution of 5.0 g Ebecryl® 220, the hexafunctional aromatic urethane acrylate oligomer discussed in connection with Example Composition 6 and 5.0 g methanol. After 30 minutes, 45.0 g of aminopropyltriethoxysilane were thoroughly blended into each solution. The resulting solution was then coated onto a polycarbonate panel, cured at 23° C. and 58% relative humidity for 24 hours and subjected to Taber abrasion testing. The results were a T-100 value of 8.7 and a T-500 value of 13.6. The composition of Example No. 21 is clearly within the scope of the present invention.

WEATHERABILITY

Testing for Weatherability

Testing for the "weatherability" of polycarbonate panels having cured coatings formed thereon was carried out in accordance with ASTM G-53, entitled *OPERATING LIGHT AND WATER EXPOSURE APPARATUS (FLUORESCENT UV CONDENSATION TYPE) FOR EXPOSURE OF NON-METALLIC MATERIALS*. In the test, the coated sample panels were alternately exposed to two different test cycles, a radiation cycle and a condensation cycle. In the radiation cycle, the panels were subjected to UV radiation at 60° C. for four hours. In the condensation cycle, the panels were subjected to water condensation at 50° C. for four hours. The cycles were repeated over a one thousand hour schedule, after which the condition of the panels was determined. Thus, two aspects of weatherability are addressed.

The weatherability of a coating composition can be quantified by the measurable parameters of changes in the Yellow Index and the percent haze of a coated polycarbonate panel as produced by testing in accordance with ASTM G-53. As a general rule of thumb, a change of about 5 percentage points or less in the Yellowness Index is an indication of very good weatherability. The same is true for a change in percent haze of about 2 percentage points or less.

Numerous UV protectants are well-known in the art. Commercially available products include ultraviolet light absorbers, such as benzotriazole compounds available from Ciba-Geigy Corporation of Hawthorne, N.Y. and sold under the marks Tinuvin® 328, 384, 1130 and 900. Other ultraviolet light absorbers are available from American Cyanamid Company, Polymer Additives Department, Wayne, N.J. under the marks Cyasorb® UV9 (2-hydroxy-4-methoxybenzophenone), UV24 (2,2'-dihydroxy-4-methoxybenzophenone) and UV 531 (2-hydroxy-4-n-octoxybenzophenone). Free radical scavengers include Tinuvin® 292, 123 and 144, also from Ciba-Geigy Corporation, and Cyasorb® UV 2908 (3,5-di-t-butyl-4-hydroxybenzoic acid, n-hexadecyl ester) and UV 5411 (2-(2-hydroxy-5-t-octylphenyl)-benzotriazole) also from American Cyanamid Company.

When used in coating compositions that are opaque and which are liberally applied over a substrate, such as exterior paint formulations, the UV protectants generally act to protect the cured coating itself. That is to say, the opacity of the cured coating is usually sufficient to protect the substrate from UV exposure.

Even in the case of clear coatings that are liberally applied, such as exterior wood finishes, the coating composition does not need an extremely high concentration of a UV absorber to offer adequate protection to an underlying substrate. This is because the protection offered by a UV absorber is directly proportional to the thickness of the cured coating, as well as the concentration of the UV absorber.

In the case of clear abrasion-resistant coatings, however, the optimum cured coating thickness is about 5 microns. Thus, high concentrations of UV absorbers, generally about 15% by weight of solids and more, are necessary to offer appreciable UV protection to a coated substrate. This phenomenon becomes very important when coating substrates that do not themselves have good resistance to ultraviolet light radiation. Examples of such UV-sensitive substrates include polycarbonate, polyethylene, polypropylene and polystyrene.

In the case of free radical scavengers, the UV protectant helps to prevent the degradation of the coating composition, itself.

The coating composition of the present invention is said to have enhancable weatherability because the composition and its cure mechanism are both compatible with high concentrations of UV protectants.

The examples below illustrate the advantages of the invention over prior art radiation-curable coatings with respect to enhancable weatherability.

EXAMPLE 22

4.8 parts of a UV protectant ((bis-1,2,2,6,6-pentylmethyl-4-piperidinyl)sebecate, a free radical scavenger which is described as a hindered amine light stabilizer sold under the designation Tinuvin®292 by Ciba Geigy Corporation of Hawthorne, N.Y.) were added to 55.2 parts of Example Composition No.3. Subtracting the weight of volatiles, the composition included the UV absorber at 15% by weight of solids. The resulting composition was then applied to two polycarbonate panels (0.020 inch (0.051 cm) thick) and allowed to cure for 72 hours at 23° C. and 50% relative humidity. The cured coating thickness was about 5 microns. The cured coating was subjected to Taber abrasion testing, showing values of T-100 at 4.9 and T-500 at 8.1. The Yellowness Index of the coated panel was measured at 4.2 and the percent haze at 0.6.

Comparative Example 1

A radiation-curable abrasion resistant coating was prepared in accordance with the teachings of U.S. Pat. No. 5,403,353 Blizzard et al. 21.7 g of trimethylolpropane triacrylate, 7.8 g of hexanediol diacrylate and 0.04 g of phenothiazine, an inhibitor, were added to 55 g of isopropyl alcohol and mixed for 60 minutes. Next, 6.24 g of aminopropyltriethoxysilane were added and mixed for an additional 60 minutes. 6.84 g of acrylic acid were then added and mixed for 60 more minutes. 64.48 g of colloidal silica (34 wt. % silica solids in an aqueous dispersion sold under the designation 1034A by the Nalco Chemical Company, Naperville, Ill.) and 20 more g of isopropyl alcohol were added and mixed for an additional 60 minutes. Finally, 12.9 g of diethyleneglycol diacrylate were added and thoroughly blended and the resulting mixture vacuum-stripped of volatiles, yielding 115 g curable solids.

4 g of a photoinitiator (2-hydroxy-2-methyl-1-phenyl-propane-1-one, sold under the name Darocure® 1173 by Ciba Geigy Corporation, Hawthorne, N.Y.) and 15 g of the Tinuvin® 292 were blended with 96 g of the curable solids obtained above, yielding a UV-curable composition having about 15 wt. % of a UV protectant.

The resulting composition was then coated over a 0.020 inch (0.051 cm) thick polycarbonate panel and subjected to 1,860 millijoules of UV radiation. Difficulty in curing was noted. The coated panel was then subjected to Taber abrasion testing, yielding a T-100 value of 15.6 and a T-500 value of 25.4. The Yellowhess Index of the coated panel measured 4.4 and the percent haze measured 0.7.

Comparative Example 2

The composition of Comparative Example No. 1 was prepared in an identical manner except that only 5 parts of the Tinuvin® 292 were added. Once again the composition was coated on a polycarbonate panels of equal thickness and subjected to 1,860 millijoules of UV-radiation. In this instance, Taber abrasion testing yielded a T-100 value of 4.4 and a T-500 value of 9.3. The Yellowness Index of the coated panel measured 2.2 and the percent haze measured 0.7.

The Taber abrasion resistance of the cured coatings of Comparative Example Nos. 1 and 2 indicates that the relatively high concentration of Tinuvin® 292 in Comparative Example No. 1 prevented it from curing to its full hardness.

After exposure to the weatherability testing procedure ASTM G-53 described above, the panel that had been coated with Comparative Example Composition No. 2 had a Yellowness Index of 13.2 and was visibly discolored, exhibiting a brown cast. This represented a change in the Yellowness Index of 11. The percent haze of the same panel was 4.9, a substantial increase.

When subjected to Taber abrasion testing, the panel exhibited a T-100 value of 7.9 and a T-500 value of 18.4. This apparent loss of abrasion resistance is believed to be attributable to deterioration of the cured coating.

These results show that by limiting the amount of UV protectant in the prior art composition to an amount that permitted it to be cured to full hardness, the weatherability of the coating was insufficient to protect the underlying polycarbonate from damage.

On the other hand, after the same testing procedure, the panel that was coated with Example Coating Composition No. 22, which is a composition within the scope of the invention, the percent haze measured 1.0, a change of only 0.4. Furthermore, the Yellowness Index after exposure measured 4.8, a change of only 0.6, which is imperceptible to the eye.

Finally, the Taber abrasion of Example Coating Composition No. 22 actually improved after exposure, having a T-100 value of 2.5 and a T-500 value of 6.2. This improvement is believed to be attributable to a lack of deterioration of the substrate, combined with the fact that the composition of the invention relies on moisture to effect cure. The high concentration of UV protectant in the composition of the invention appears to have very adequately protected the coating of the invention and hence, permitted to coating to protect the underlying polycarbonate substrate.

Those skilled in the art will appreciate that the composition of the present invention will have utility beyond use simply as an abrasion-resistant coating. For instance, it is contemplated that it may be useful as an additive to overprint varnishes, inks, paints and wooden deck protectants. It will be further apparent to those skilled in the art that numerous known additives including pigments, slip aids, flow aids, diluents, antioxidants and particulate fillers may be used in combination with the composition of the invention.

Although various embodiments of the present invention, pointing out the particular advantages and features thereof, have been set forth in the foregoing description, the scope of the invention is not limited thereto and should be judged only in accordance with the following claims and equivalents thereof.

What is claimed is:

1. A moisture-curable composition useful for forming an abrasion-resistant coating on a substrate, said composition comprising the following components:

(A) at least one multifunctional acrylate, having a general formula which includes a plurality of functional acrylate groups;

(B) at least one alkoxy-functional organometallic compound selected from the group consisting of 1) organometallic compounds having the empirical formula $M(OR)_4$, wherein M is selected from the group consisting of Si and Ti, and each OR is the same or a different alkoxy group and 2) hydrolyzates of the organometallic compounds of 1);

(C) at least one trialkoxyaminosilane of the general formula

wherein each OR is as defined above, Q is a divalent hydrocarbon group, which Q groups may be the same or different, and d is 0 or 1;

said at least one multifunctional acrylate (A) and said at least one trialkoxyaminosilane (C) being present in quantities such that the molar ratio of $NH_2$ groups to functional acrylate groups is at least 10:1; and said composition, without additional components added thereto, when moisture-cured, exhibiting a Taber abrasion T-100 number of about 10 or less and a Taber abrasion T-500 number of about 15 or less.

2. A composition in accordance with claim 1 wherein said at least one multifunctional acrylate (A) is selected from the group consisting of 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetraethylene glycol dimethacrylate, 1,3-butylene glycol diacrylate, triethylene glycol diacrylate, triisopropylene glycol diacrylate, polyethylene glycol diacrylate, bisphenol A dimethacrylate; trimethylolpropane triacrylate, trimethylolpropane trimethacrylate, pentaerythritol monohydroxy triacrylate, and trimethylolpropane triethoxy triacrylate; pentaerythritol tetraacrylate, di-trimethylolpropane tetraacrylate; and dipentaerythritol (monohydroxy) pentaacrylate.

3. A composition in accordance with claim 1 wherein said at least one multifunctional acrylate (A) is an oligomer selected from the group consisting of bisphenol A epoxy diacrylate, hexafunctional aromatic urethane acrylate, aliphatic urethane diacrylate, tetrafunctional polyester acrylate, and polybutadiene diacrylate.

4. A composition in accordance with claim 1 wherein said at least alkoxy-functional organometallic compound is selected from the group consisting of tetramethoxy silane, tetraethoxy silane and tetrabutyl titinate.

5. A composition in accordance with claim 1 wherein said at least one trialkoxyaminosilane is selected from the group consisting of 3-aminopropyltriethoxysilane, 3-aminopropyltrimethoxysilane; and n-(2-aminoethyl)-3-aminopropyltrimethoxysilane.

6. A composition in accordance with claim 1 wherein said at least one multifunctional acrylate (A) and said at least one trialkoxyaminosilane (C) being present in quantities such that the molar ratio of $NH_2$ groups to functional acrylate groups is at least 20:1.

7. A composition in accordance with claim 6 wherein said at least one multifunctional acrylate (A) and said at least one trialkoxyaminosilane (C) being present in quantities such that the molar ratio of $NH_2$ groups to functional acrylate groups is at least 30:1.

8. A composition in accordance with claim 7 wherein said at least one multifunctional acrylate (A) and said at least one trialkoxyaminosilane (C) being present in quantities such that the molar ratio of $NH_2$ groups to functional acrylate groups is at least 40:1.

9. A composition in accordance with claim 1 wherein said composition, when cured, exhibits a Taber abrasion T-100 number of about 5 or less and a Taber abrasion T-500 number of about 10 or less.

10. A composition in accordance with claim 1 further comprising (D) a UV protectant in the form of an ultraviolet light absorber.

11. A composition in accordance with claim 10 wherein said UV protectant in the form of an ultraviolet light absorber (D) is present in an amount up to about 15%, by weight, of the combined weights of (A), (B), (C) and (D).

12. A composition in accordance with claim 1 further comprising (E) a UV protectant in the form of a free radical scavenger.

13. A composition in accordance with claim 12 wherein said (E) UV protectant in the form of said free radical scavenger is present in an amount up to about 15%, by weight, of the combined weights of (A), (B), (C) and (E).

14. An article of manufacture comprising:

a substrate presenting at least one surface;

a cured coating formed on said at least one surface;

said cured coating being formed from moisture-curing a composition comprising the following components:
- (A) at least one multifunctional acrylate, having a general formula which includes a plurality of functional acrylate groups;
- (B) at least one alkoxy-functional organometallic compound selected from the group consisting of 1) organometallic compounds having the empirical formula $M(OR)_4$, wherein M is selected from the group consisting of Si and Ti, and each OR is the same or a different alkoxy group and 2) hydrolyzates of the organometallic compounds of 1);
- (C) at least one trialkoxyaminosilane of the general formula

$(OR)_3Si(QNH)_dQNH_2$ wherein each OR is as defined above, Q is a divalent hydrocarbon group, which Q groups may be the same or different, and d is 0 or 1;

said at least one multifunctional acrylate (A) and said at least one trialkoxyaminosilane (C) being present in quantities such that the molar ratio of $NH_2$ groups to functional acrylate groups is at least 10:1;

and said cured coating, without additional components added thereto, exhibiting a Taber abrasion T-100 number of about 10 or less and a Taber abrasion T-500 number of about 15 or less.

15. An article in accordance with claim 14 wherein said composition from which said cured coating is formed further comprises (D) a UV protectant in the form of an ultraviolet light absorber.

16. An article in accordance with claim 15 wherein said UV protectant in the form of an ultraviolet light absorber (D) is present in an amount up to about 15%, by weight, of the combined weights of (A), (B), (C) and (D).

17. An article in accordance with claim 14 wherein said composition from which said cured coating is formed further comprises (E) a UV protectant in the form of a free radical scavenger.

18. An article in accordance with claim 17 wherein said UV protectant in the form of a free radical scavenger (E) is present in an amount up to about 15%, by weight, of the combined weights of (A), (B), (C) and (E).

19. An article in accordance with claim 14 wherein said substrate presenting at least one surface is fabricated from materials selected from the group consisting of polycarbonate, polyethylene, polypropylene, polyethylene terephthalate, polystyrene, glass and wood.

* * * * *